Patented Aug. 16, 1949

2,479,439

UNITED STATES PATENT OFFICE 2,479,439

HYDROCARBON SYNTHESIS OPERATION

Alexis Voorhies, Jr., Baton Rouge, La., assignor to Standard Oil Development Company, a corporation of Delaware No Drawing. Application April 27, 1948, Serial No. 23,629

6 Claims. (Cl. 260—449.6)

This application is a continuation-in-part of my copending application Serial No. 713,093, filed November 29, 1946, now abandoned.

The present invention is concerned with the preservation and regeneration of catalysts. The invention is particularly directed to an improved process for regulating and controlling the activity and size of catalyst particles. It is especially directed to a process of controlling the activity of catalyst utilized in the synthesis of hydrocarbons, so that excessive carbonization with attendant fragmentation of the catalyst in the reaction zone does not occur. In accordance with the invention unpromoted or underpromoted iron group catalysts are promoted in situ in a catalytic reaction zone during the initial hours of a synthesis operation until the optimum concentration of promoter is reached. Then as necessary and in order to maintain high yields, additional promoter may be added during the hydrocarbon synthesis run. Simultaneously, carbon formation is controlled in the hydrocarbon synthesis zone by the addition of water.

It is well known in the art to conduct hydrocarbon synthesis reactions by contacting hydrogen and oxides of carbon with catalysts under various temperature and pressure conditions. The catalyst employed is usually selected from the iron group metals, as for example, iron, cobalt and nickel. The catalysts are utilized either alone or are employed in conjunction with carriers, such as kieselguhr, diatomaceous earth, synthetic gels, silica, and alumina. Promoters, such as oxides or salts of sodium, potassium, chromium, zinc, aluminum, magnesium, and the rare earth metals are used with the iron group metals. These catalysts are employed in either fixed bed or fluid catalyst operations.

The temperatures employed in the synthesis reaction vary widely, as for example, in the range from about 300° F. to about 800° F. and are generally in the range from about 350° F. to about 750° F. The pressures, likewise, vary considerably and are a function of other operating conditions, such as catalyst employed, activity of the catalyst, character of the feed gases and the temperature utilized. Pressures in the range from about 1 to 100 and higher atmospheres have been suggested. The character of the feed gases introduced into the synthesis reaction zone depends somewhat on the particular temperatures and pressures, and upon the catalyst employed. For example, when employing cobalt type catalyst, it is preferred to use about 1 mol of carbon monoxide to about 2 mols of hydrogen, while when an iron catalyst is utilized the fresh feed composition is not so critical and ordinarily lies between 0.8 mol and 2.5 mols of hydrogen per mol of carbon monoxide.

The synthesis gases comprising hydrogen and carbon monoxide are produced by various procedures. Methane or natural gas may be oxidized with a reducible metal oxide, with pure oxygen or with gases comprising oxygen. Coal, shale and solid other hydrocarbons may be reacted with steam and/or carbon dioxide to form hydrogen and carbon monoxide for use as a synthesis gas. The reaction may be conducted in a single or in a plurality of stages. For example, one procedure is to reform methane or natural gas using steam and carbon dioxide for the production of carbon monoxide and hydrogen. When employing methane as feed gas and oxidizing the same with a reducible metal oxide, the reactions are generally conducted at temperatures in the range from about 1400° F. to about 2000° F. When the synthesis gases are produced by utilizing oxygen and methane or natural gas, the temperatures in the reaction zone are usually in the range from about 2000° F. to about 3000° F.

It is also known in the art to contact gases and solids by passing the gases upwardly through an enlarged treating zone, containing a body of finely divided solids to be contacted, at a controlled velocity to maintain the solids in the treating zone in a quasi-liquid like state. Under properly controlled conditions, the subdivided solid particles are not only maintained in a highly turbulent, quasi-liquid and ebullient state, but there exists a rapid and overall circulation of the fluidized solids throughout the fluid bed. In these fluid operations the catalyst particles generally comprise particles having particle sizes in the range from about 0 to 200 microns and higher. These particles are maintained in a fluid ebullient state by means of an upflowing suspending gas, the velocity of which is in the range of about 0.1 to 5 feet per second and higher.

The invention finds specific application in a hydrocarbon synthesis reaction wherein the synthesis gases are reacted in the presence of a suitable catalyst to form hydrocarbon constituents containing more than one carbon atom in the molecule. For example, in this process one of the important problems confronting the development of the synthesis process is that carbon builds up on the catalyst causing fragmentation and loss of the catalyst from the reactor by elutriation. Although, a certain amount of carbon may be desirable on the catalyst surface, this factor must be controlled.

In accordance with the invention extraneous water vapor is added to the feed gas and at the same time an unpromoted or under-promoted catalyst is utilized during the initial stages of the synthesis. This unpromoted or under-promoted catalyst which preferably comprises an iron catalyst is then promoted in situ in a fluid catalyst reactor during the initial stages of the synthesis operation until the optimum concentration of promoter is reached. As necessary to maintain high yields, additional promoter may be added during the run.

Experience in hydrocarbon synthesis has shown that the function of the promoter on the catalyst is primarily to increase selectivity and activity of the catalyst. However, an excess amount of promoter will result in excessive carbonization of the catalyst with resulting catalyst disintegration. As discussed hereinbefore the promoters commonly used are alkali compounds, such as the salts or hydroxides of potassium, sodium and lithium. A specifically effective promoter from the standpoint of activity and selectivity is potassium fluoride. However it has been demonstrated that excessive amounts of this particular promoter will result in excessive catalyst carbonization.

The effects of a promoter and the need therefor depend critically on the conditions of hydrocarbon synthesis. For example, those conditions most likely to give good product quality, particularly high temperature operation in the range from about 600° F. to 750° F., unfortunately demand the use of greater amounts of promoter than do the milder conditions. This entails a greater risk from the standpoint of catalyst carbonization. There has recently been discovered one effective means of repressing catalyst carbonization and resulting disintegration, and that is by the introduction of extraneous water at the reactor inlet. This expedient, however, has a tendency to decrease the selectivity of the catalyst when the amount of water exceeds a certain critical value, which in turn depends upon the catalyst composition and the conditions of operation.

This invention embraces a novel and satisfactory method for taking optimum advantage of the favorable characteristics of the catalyst promoter and the use of water additions. As just pointed out, the effect of catalyst promoter and water addition are in many ways just the reverse; increased amounts of promoter tend to give greater activity and selectivity but more carbonization, just the opposite of the result of increased water addition.

According to the present invention, the hydrocarbon synthesis process may be conducted as follows:

An unpromoted catalyst, specifically a rather pure iron oxide such as sintered pyrites ash, is charged to the reactor in the regular way. This process has reference to a fluid catalyst operation. Catalyst charged would be of conventional particle size. The unpromoted iron oxide is reduced in the conventional fashion.

Synthesis is begun at predetermined standard conditions, which would give good selectivity, good activity, and good product quality if the catalyst were promoted to the optimum degree. Pressures in the range from 200 to 750 pounds per sq. in.; temperatures in the range from about 550° F. to 750° F.; mol ratios of hydrogen to carbon monoxide are from 0.5 to 1, to 4 to 1; recycle ratios of about 0.5–4, preferably 2 to 1 and feed rates of about 10 to 200 SCF of feed gas per lb. of catalyst in the reactor per hour are employed.

Such conditions, as stated, would initially give poor selectivity and poor activity with an unpromoted or under-promoted catalyst; but on the other hand, rather complete freedom from "carbon" formation difficulties, i. e. deposition of carbonaceous material on the catalyst, is secured.

From the start of the synthesis run, a small amount of promoter is added to the reactor. The purpose is to obtain a slow and even impregnation of the catalyst with the promoter, and to furnish a means of determining just when the optimum amount of promoter has been added. For example, the selectivity is closely watched while it increases to a satisfactory value, such as 190–200 cc. of hydrocarbons containing four carbon atoms in the molecule and higher boiling constituents per cubic meter of $H_2+CO$ consumed. The promoter used may be a dilute aqueous solution of KF or equivalent other good promoter. When an aqueous solution is employed, the water may conveniently be that normally used as injection water at the reactor inlet to suppress catalyst carbonization. The invention, however, is not limited to the introduction of catalyst by means of an aqueous solution. Other methods of introducing the promoter may be employed. For example, the promoter may be introduced as a dry powder into the total feed gas stream or through a side stream employing recycle or fresh feed gases as a carrying medium. Still another method is to employ a solution of the promoter in hydrocarbon synthesis product water, which normally contains organic acids and other compounds which would promote the solubility of certain promoter compounds.

The promoter addition would be stopped, as mentioned above, when the selectivity has reached a predetermined value, and before the promoter is sufficiently great to begin to cause excessive catalyst carbonization. For example, a 0.1% solution of KF is injected over a period of about 150 hours at such a rate as to result in a 1% concentration of KF on the catalyst. The 150 hours allows ample time for deciding the point of optimum catalyst impregnation, and likewise it permits uniform and thorough impregnation of the catalyst with the promoter.

Whenever conditions change in the unit, either by design or accident, in such a way as to result in lower selectivity or excessive catalyst carbonization, the foregoing means will be at hand to correct the situation. For example, if selectivities begin to decrease while water addition is normal, the remedy is to begin to inject more promoter until the selectivity has regained its original value. Contrariwise, if carbon formation begins to increase some time during the run, the rate of water addition is increased to just such a point as to correct this situation.

In any particular situation, it is obvious that the success of the observation will depend on the experience and good judgment of the operator in applying the teachings of this invention for it is impossible to disclose the precise amount of water and/or promoter that must be employed so as to cover every conceivable contingency. Rather the present invention functions as a guide and sign post indicating to the operator the manner of achieving maximum efficiency during a hydrocarbon synthesis operation. Experience during a very large number of laboratory and pilot plant runs have shown that the following have given good results using a powdered iron catalyst in the form of a fluidized bed and the conditions of temperature, pressure, hydrogen to carbon monoxide ratio in the total feed indicated above:

|  | Broad | Preferred |
|---|---|---|
| Mol ratio of $H_2$ to $H_2O$ in total feed | 5-25 | 7-15 |
| Wgt. Percent of Promoter (based iron and calculated as KF) | 0.1-5 | 0.5-2.5 |

This type of operation is especially applicable to the use of a cheap catalyst base, such as sintered pyrites ash which may be continuously replaced by daily or more frequent additions and removal of catalyst from the reactor. The added material would preferably be the unpromoted iron oxide, either with or without prior reduction. However, the invention is not to be limited to the use of sintered pyrites ash, but will apply as well as any catalyst base whether unpromoted or partially promoted.

The process of the invention is not to be limited by any theory as to mode of operation but only in and by the following claims in which it is desired to claim all novelty insofar as the prior art permits.

I claim:

1. An improved hydrocarbon synthesis process which comprises reacting together, under synthesis conditions, hydrogen and carbon monoxide initially in the presence of an unpromoted powdered iron catalyst in the form of a fluidized bed contained in a reaction zone, adding an alkali metal compound to the reaction zone at a slow rate during such a period of time as to cause a slow and homogeneous impregnation of said alkali metal compound within said catalyst, and to the extent that the desired yields of normally liquid hydrocarbons are obtained from the reaction zone, whereupon the feeding of the alkali metal compound is discontinued, the amount of said promoter with respect to the catalyst and contained thereon lying within the limits of from about 0.1 to 5 wt. % after the initial period, and adding water to the reaction zone to repress carbon formation in an amount such that the feed to the reaction zone contains 5 to 25 mols of hydrogen per mol of water.

2. The method of claim 1 in which the amount of alkali metal compound maintained in the catalyst is from about 0.5-2.5 weight percent based on the iron and the amount of water fed to the reaction zone is such that 7-15 mols of hydrogen per mol of water are contained in the total feed.

3. The method of claim 2 in which the alkali metal compound is KF.

4. The method of claim 3 in which the iron catalyst is a sintered pyrites ash.

5. Improved hydrocarbon synthesis reaction which comprises introducing feed gases comprising carbon monoxide and hydrogen into a hydrocarbon synthesis reaction zone, introducing water into said reaction zone, in amounts of from about 1 mol per 7-15 mols of hydrogen in the total feed, contacting the feed gases with a catalyst selected from the group consisting of iron, cobalt and nickel in said reaction zone under temperature and pressure conditions adapted to produce the desired synthesis, said catalyst being characterized by containing no promoter during the initial stages of the reaction, gradually adding a promoter to the reaction zone until the selectivity of the catalyst is increased to produce a product of 180 to 210 cc. of hydrocarbons having 4 carbon atoms in the molecule and higher boiling constituents per cubic meter of hydrogen and carbon monoxide consumed and thereafter adding additional promoter to maintain the catalyst activity in this range.

6. The method of claim 5 further characterized in that the promoter is KF and that the same is added in the form of a dilute aqueous solution during a period of about 150 hours and until the iron catalyst is homogeneously impregnated with about 1% by weight of said promoter.

ALEXIS VOORHIES, JR.

REFERENCES CITED

The following references are of record in the file of this patent:

UNITED STATES PATENTS

| Number | Name | Date |
|---|---|---|
| 2,183,145 | Michael et al. | Dec. 12, 1939 |
| 2,254,806 | Michael | Sept. 2, 1941 |
| 2,395,875 | Kearby | Mar. 5, 1946 |
| 2,447,505 | Johnson | Aug. 24, 1948 |